Figure 4:
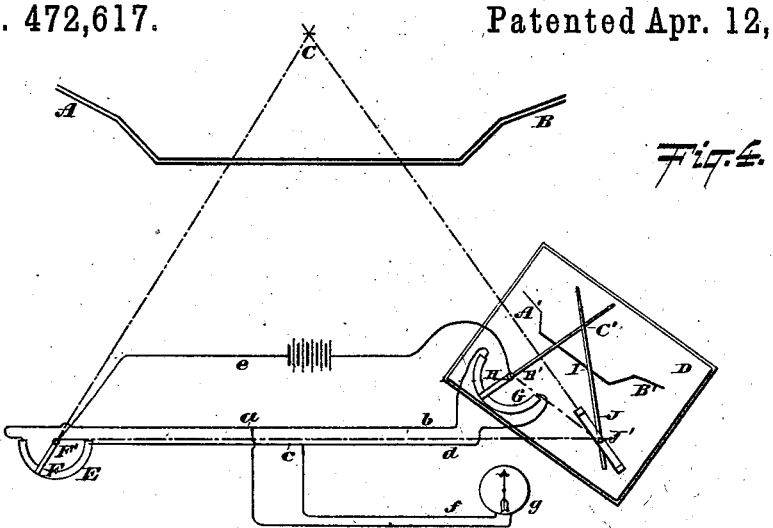

(No Model.) 3 Sheets—Sheet 1.
B. A. FISKE.
METHOD OF AND APPARATUS FOR FINDING THE POSITION OF DISTANT OBJECTS.
No. 472,617. Patented Apr. 12, 1892.
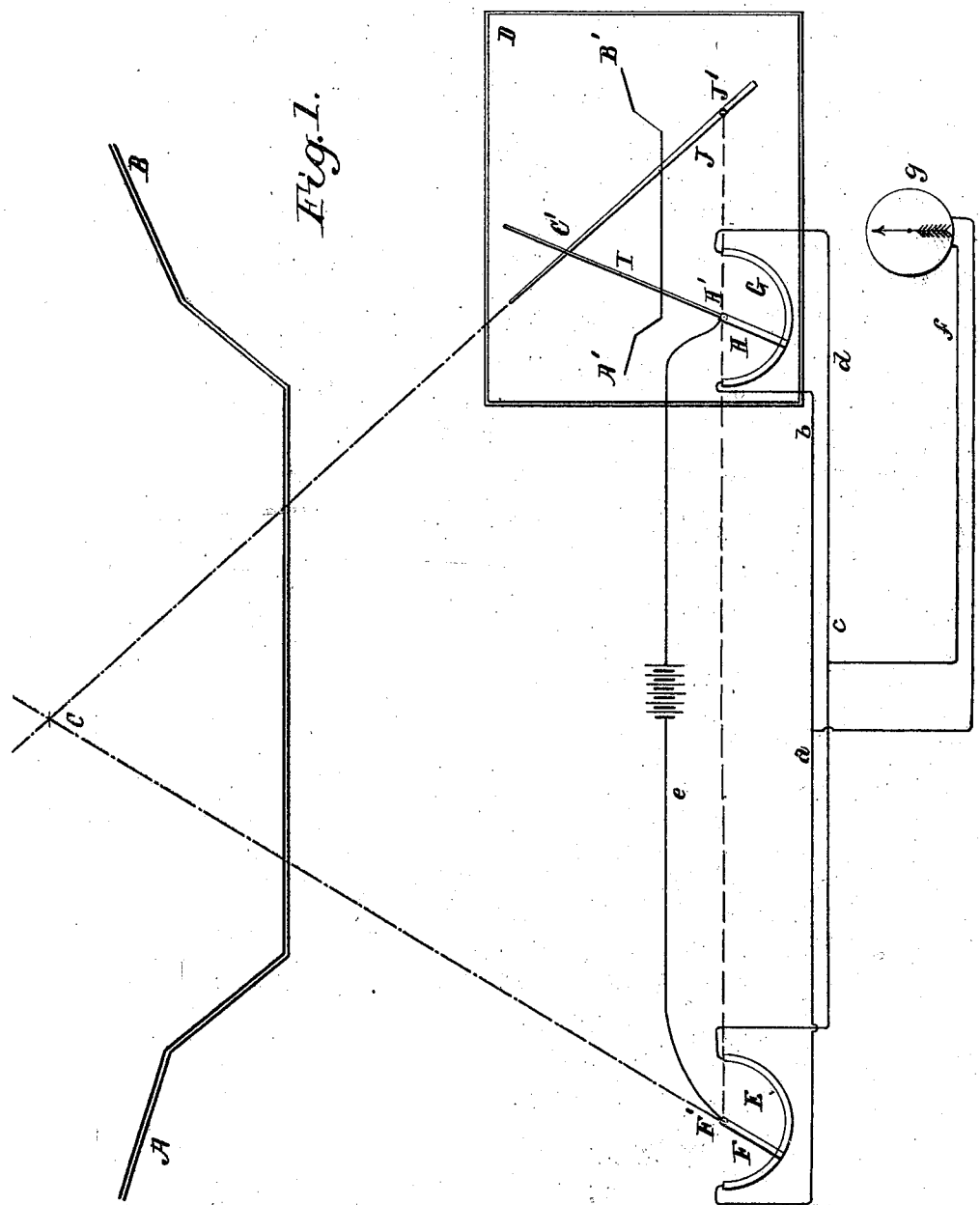

(No Model.)  
3 Sheets—Sheet 2.
B. A. FISKE.
METHOD OF AND APPARATUS FOR FINDING THE POSITION OF DISTANT OBJECTS.
No. 472,617.
Patented Apr. 12, 1892.
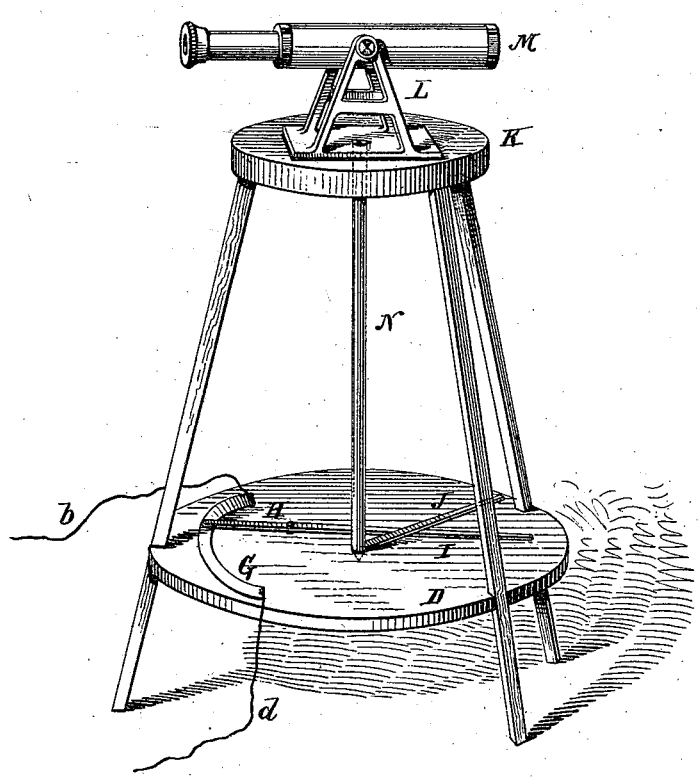
WITNESSES:  
Gustave Dieterich.  
C. Aug. Dieterich.
INVENTOR  
Bradley A. Fiske  
BY Park Benjamin  
his ATTORNEY.

(No Model.) 3 Sheets—Sheet 3.

B. A. FISKE.
METHOD OF AND APPARATUS FOR FINDING THE POSITION OF DISTANT OBJECTS.

No. 472,617. Patented Apr. 12, 1892.

WITNESSES:
Gustave Dieterich
C. Aug. Dieterich

INVENTOR
Bradley A. Fiske
BY Park Benjamin
his ATTORNEY.

UNITED STATES PATENT OFFICE.

BRADLEY A. FISKE, OF THE UNITED STATES NAVY.

METHOD OF AND APPARATUS FOR FINDING THE POSITION OF DISTANT OBJECTS.

SPECIFICATION forming part of Letters Patent No. 472,617, dated April 12, 1892.

Application filed October 22, 1890. Serial No. 368,936. (No model.)

*To all whom it may concern:*

Be it known that I, BRADLEY A. FISKE, of the United States Navy, have invented a new and useful Improvement in Methods of and Apparatus for Finding the Position of Distant Objects, of which the following is a specification.

In Letters Patent No. 418,510, granted to me December 31, 1889, I have described and claimed a method for finding the position of a distant object, which consists, first, in directing two alidade-arms moving over arcs of conducting material in line with said object, the said arcs having their extremities on a base-line; second, placing two pointers or arms moving over like arcs of conducting material located at a distant station and similarly disposed with reference to a base-line at the same angle as said first-mentioned arms, and thereby establishing an electrical balance in each of two circuits, and, lastly, noting the point of intersection of the pointers at the distant station upon a chart representing the area including the position of the distant object on a reduced scale.

It will be apparent that my aforesaid method involves the employment of two pointers, each moving over an arc of conducting material and each laid at the same angle with an alidade-arm moving over a similar arc of conducting material and directed upon the object.

My present invention is designed for the same purpose as that set forth in my preceding patent, but is materially simplified by the omission of two of the arcs of conducting material and corresponding circuit connections. It embodies, first, a pivoted alidade-arm or telescope moving over an arc of conducting material, which arm is directed upon the distant object; second, a pivoted pointer moving over a like arc of conducting material in a Wheatstone-bridge circuit with said first-named arc, the arrangement being such that when the alidade-arm on the first arc and the pointer on the second arc stand at the same angle the circuit is balanced. The pointer-arm moves over a suitable chart representing the area which includes the position of the distant object on a reduced scale. On this chart there is a simple pivoted arm, which may be an alidade-arm or a telescope itself and be trained directly upon the object, or said arm may be mechanically controlled by a telescope directed upon the object, so that it will make with the other arm an angle equal to that made by the lines of sight drawn from the two telescopes to the object. The position of the object is then shown by the intersection of the electrically-directed pointer and the mechanically-directed arm upon the chart.

In the accompanying drawings, Figure 1 is a diagram showing the general disposition of my invention, and Fig. 4 is a similar diagram showing the chart D in different position. Fig. 2 shows a special construction whereby the mechanically-directed arm is controlled by a suitable telescope, and Fig. 3 the arrangement in detail of the pointer-arms.

Similar letters of reference indicate like parts.

A B represent, for example, the parapet of a fortification. The distant object is supposed to be located at C, and it is the position of this object which is to be determined upon a suitable chart D, on which the fortification-line A' B' appears on a reduced scale.

E is an arc of conducting material.

F is a telescope or alidade-arm pivoted at one end at F', with its free extremity moving over and making contact with the arc E.

G is an arc similar in all respects to the arc E and located in suitable proximity to the chart D.

H is an arm pivoted at H' and having its free end sweeping over and making contact with the arc G and carrying a pointer I.

*a b c d* are members of a Wheatstone bridge connecting the arcs E and G.

*e* is a loop including the battery, and *f* the loop including the galvanometer *g*.

It will be obvious that when the arm H is set upon its arc G at the same angle to the line H' F' as the arm F upon the arc E then the bridge will balance and the galvanometer will indicate zero, and hence, inasmuch as the telescope F points to the actual object C, so the arm H will point to the corresponding position of the object C or C' on the chart D. Pivoted upon the chart D at J' is an arm J, which arm may be provided with a telescope or alidade, so that it may be directed upon the object C. The arm J is long enough to make intersection with the arm I. If then the arm J is trained directly upon the object, inasmuch as the line H' J', joining the pivots of the arms I J on the chart D, correspond to the base-line F' J, extending between the distant stations, and as the angle C' H' J' equals the angle C F' J', it follows that the intersection of the arms I and J at C' indicates the position of the object C upon the chart D. The chart being suitably drawn to scale and laid off in divisions of known dimensions, it then becomes easy to recognize at a glance both the bearing and distance of the object C from any given point on the chart.

In actual practice and for purposes of convenience I have adopted an apparatus which is represented in Fig. 2. This consists of a tripod supporting an upper platform K, which carries the standard L, upon which is pivoted the telescope M. Extending downward from the standard L and through the platform K is a shaft N, which turns with the telescope and standard. The arm J is carried by the shaft N and moves over a table also supported by the tripod, on the upper surface of which is marked the chart D. The arm J may be set parallel to the telescope M, so that when the telescope M is directed upon the object the arm J will also be directed upon said object, although, as hereinafter explained, this parallelism of arm and telescope is not essential. Carried upon the lower table are also the arc G and arm H I.

The intersection of the arms I J over the chart D, as already explained, shows the position of the distant object, and the apparatus of Fig. 2, as indicated in Fig. 1, is to be located at one station, while the arc E, with its telescope F, is to be located at any suitable distant station.

Referring now to Fig. 4, it will be seen that in this case the line H' J' on the chart D, while corresponding, as before, to the base-line F' J', does not coincide with that line, and hence that the arm J is itself not directed upon the object. This represents the condition before referred to when the arm J is not set parallel to the axis of the telescope M, but at an angle thereto, this angle being such that the angle H' C' J' will continue the same as the angle F' C J' despite a change in relative position of the chart D, such as indicated in Fig. 4.

Figure 3:
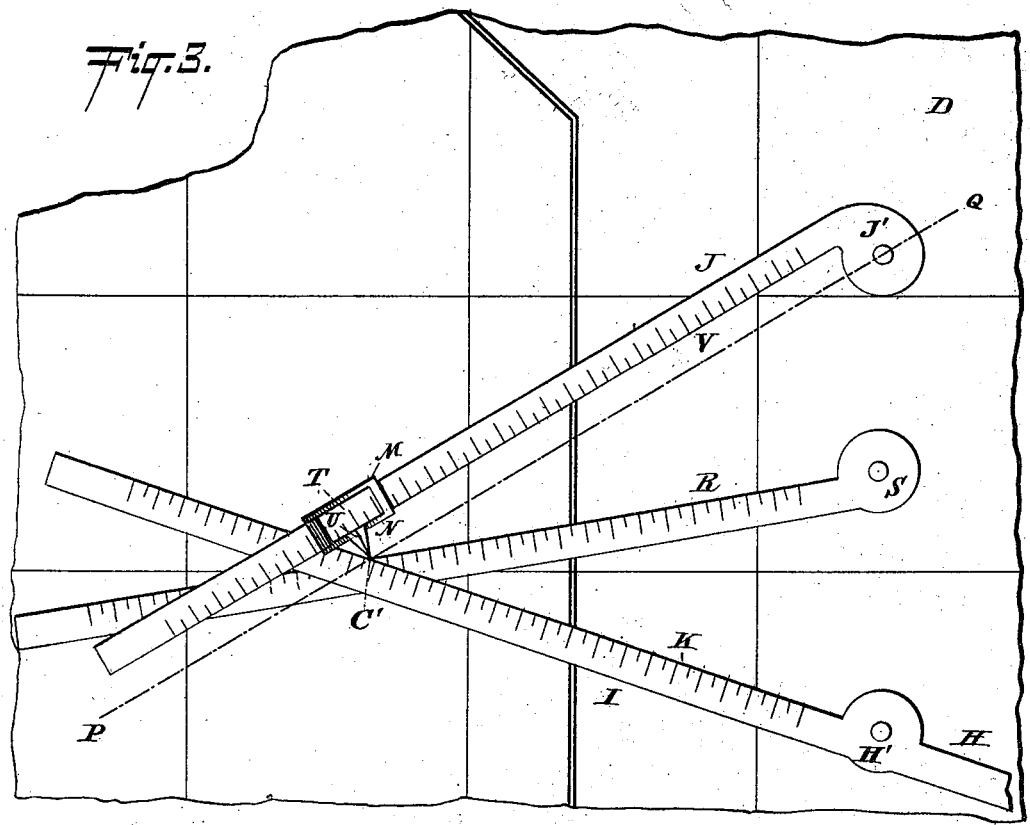

In Fig. 3 is represented a construction of the intersecting arms or pointers I and J which is especially adapted for the uses before detailed and which allows of the actual intersecting point being determined with great accuracy. It will be obvious that with a chart laid out on a small scale and using arms I J of sufficient width or thickness to give them rigidity the exact point of intersection of lines drawn through the pivot-centers of the arms will be difficult to determine, and there may be considerable error in regarding the apex of any one of the four angles made by the intersecting arms as the true point indicated. In the device shown in Fig. 3 this source of error is practically eliminated, and in addition other advantages which I will detail hereinafter are secured.

The arm I has one edge K on a line passing through the pivot-center H'. On the arm J is a slide M, which carries projecting from the edge V of said arm a pointer N, the extremity of said pointer being upon an imaginary line drawn through the pivot-center J' and indicated by the dotted line P Q. It will be obvious that the point on the arm I indicated by the pointer N will be the exact point of intersection of lines drawn through the pivot-points H' J'. I propose to graduate the arms I and J linearly to conform to the scale of the chart D, so that the distance of the object from both separated stations can at once be read. Thus on the arm I may be read the distance H' C', which is that of the object from the station at which is located the telescope F, Fig. 1, and on the arm J may be read the distance J' C', which is the distance of the object from the station at which is located the chart D. If it be desired to determine the distance of the object from any intermediate station between the two mentioned, a third pointer R may be placed in position between the two arms I J and situated in the same relation thereto as the intermediate station is to the two extreme stations. The distance from the pivot-point S of this arm to the point C'—the place of intersection of the edge of said arm with the point of contact of the edge K of arm I—and the apex of the pointer N shows the distance of the object from the pivot-point S, and hence from the intermediate station. The slide M may be moved along by hand and may, if desired, be provided with any mechanical means for causing its motion. It is provided with an opening T, through which the scale-marks on the arm J may be read, and to allow this reading being made there is a central mark U made on the pointer N, which comes into coincidence with any one of the scale-marks.

I claim—

1. The method of finding the position of a distant object, which consists, first, in directing an alidade-arm F, moving over an arc of conducting material in line with said object; second, placing a pointer or arm I, moving over a similar arc of conducting material and located at a distant station at the same angle as said first arm, and thereby establishing an electrical balance in a circuit including said arms, arcs, a battery, and an indicating device; third, directing a second alidade-arm J at said distant station in line with said object, and, fourth, noting the point of intersection of the lines of direction of said arms I and J on a chart D, representing the area including the position of said distant object on a reduced scale.

2. In a range and position finder, a chart representing the area including said object on a reduced scale and two pivoted arms moving over said chart, one of said arms being capable of mechanical direction or train upon said object, and in combination with the other arm an electrical indicating device, and an alidade-arm arranged to bear upon the said object and located at a distant station, and circuit connections between said arms, the said electrical device operating to indicate the equality of angle on their arcs of the two arms in circuit.

3. In a range and position finder and located at one station at the extremity of a given base-line F' J', an alidade-arm F, moving over an arc E of conducting material and located at a distant station, a chart D, having laid off thereon a base-line H' J', corresponding to the base-line F' J', and pivoted on said base-line H' J' an arm H, moving over an arc G, similar to arc E, the said arcs being connected in Wheatstone-bridge circuit with a battery and an electrical indicating device, an arm or pointer J, and also an alidade or telescope M, the aforesaid parts operating so that when the alidade F is directed upon the object C, making an angle, as C F' J', with the base-line F' J', and the corresponding arm H is placed at the same angle on the arc G, making an angle, as C' H' J', with the base-line H' J', the connecting-circuit will balance and when the telescope M is directed upon the object C the arm J shall make the same angle with the line H' J' as said telescope does with the line F' J'.

4. The combination of the telescope M, carrying the shaft N, provided with the arm J, and the table or chart-surface D, the arc G of conducting material, and the arm H I, making electrical contact with said arc and moving over the chart D.

5. In a range or position finder, the combination of two index-arms I J, pivoted on a plane surface, one of said arms having its inner edge out of line with the pivot-center, and on said arm a movable pointer having its apex disposed in a line drawn longitudinally said arm and passing through said pivot-center.

6. In a range or position finder, the combination of two index-arms I J, pivoted on a plane surface, one of said arms having its inner edge out of line with the pivot-center, and on said arm a movable pointer having its apex disposed in a line drawn longitudinally said arm and passing through said pivot-center, one of said arms being provided with a scale-marking.

7. In a range or position finder, the combination of two index-arms I J, pivoted on a plane surface, one of said arms having its inner edge out of line with the pivot-center, and on said arm a movable pointer having its apex disposed in a line drawn longitudinally said arm and passing through said pivot-center, each of said arms being provided with a scale-marking.

8. In a range or position finder, the combination of two index-arms I J, pivoted on a plane surface, one of said arms I having its inner edge K coinciding with a line drawn through the pivot-center H' and the other arm J having its inner edge V out of line with the pivot-center J', and on said last-named arm a movable pointer having its apex disposed in a line drawn through said pivot-center J'.

9. In a range or position finder, two pivoted alidade-arms located at a distant station and electrical circuit connections between them, whereby the said arms may be established at the same angle relatively to corresponding base-lines, and in combination with one of said arms and adapted to meet or intersect the same a pivoted pointer or index.

10. In a range or position finder, in combination with a support, such as a tripod, two tables D and K, supported thereby, the vertical shaft N, the telescope or alidade-arm M, supported by said shaft N above said table K, and the radial arm J, also supported by said shaft N and moving over the table D.

BRADLEY A. FISKE.

Witnesses:
JAMES S. GREVES,
M. BOSCH.